(12) United States Patent
Cheadle et al.

(10) Patent No.: US 6,551,209 B2
(45) Date of Patent: Apr. 22, 2003

(54) ELECTRONICALLY ACTUATED LOCKING DIFFERENTIAL

(75) Inventors: Ross K. Cheadle, Wixom, MI (US); Joseph F. Rosiek, Howell, MI (US); Allan S. Ludwig, Battle Creek, MI (US); Lawrence McAuliffe, Jr., Battle Creek, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/877,830

(22) Filed: Jun. 8, 2001

(65) Prior Publication Data

US 2001/0044355 A1 Nov. 22, 2001

Related U.S. Application Data

(63) Continuation-in-part of application No. 09/484,160, filed on Jan. 18, 2000, now abandoned.

(51) Int. Cl.[7] .............................................. F16H 48/24
(52) U.S. Cl. ...................... 475/150; 475/231; 192/84.92
(58) Field of Search ................................ 475/150, 231, 475/239; 192/35, 84.92, 84.7

(56) References Cited

U.S. PATENT DOCUMENTS

| | | | | |
|---|---|---|---|---|
| 2,778,246 A | * | 1/1957 | Thornton | 475/241 |
| 3,606,803 A | * | 9/1971 | Ottemann | 192/35 |
| 3,732,752 A | | 5/1973 | Louckes et al. | |
| 4,805,485 A | * | 2/1989 | Ida | 180/250 |
| 5,007,886 A | * | 4/1991 | Holmquist et al. | 475/230 |
| 5,092,825 A | * | 3/1992 | Goscenski et al. | 475/150 |
| 5,943,911 A | * | 8/1999 | Beckerman | 192/35 |
| 5,989,147 A | * | 11/1999 | Forrest et al. | 475/150 |
| 6,083,134 A | * | 7/2000 | Godlew | 475/150 |

FOREIGN PATENT DOCUMENTS

| | | | |
|---|---|---|---|
| JP | 11-270654 A | * | 10/1999 |
| JP | 11-294562 A | * | 10/1999 |

* cited by examiner

*Primary Examiner*—Saul Rodriguez
*Assistant Examiner*—Ankur Parekh
(74) *Attorney, Agent, or Firm*—L. J. Kasper (57) ABSTRACT

A differential gear mechanism including a first output gear (25), and a cam and ramp actuator (55) including first (59) and second (63) actuating plates, relative rotation of which results in axial movement of said first plate (59) toward said first output gear (25). The mechanism includes an electromagnetic actuator (57) operable to cause rotation of the second actuating plate (63), relative to a gear case (11). Both actuating plates (59,63) are disposed external to an end wall (53) of the gear case, the first actuating plate (59) having a plurality of actuation members (85) extending axially through openings (81) in the end wall. A locking plate (41) is disposed adjacent the first output gear (25), and is fixed to be non-rotatable relative to the gear case, but axially moveable therein. The output gear (25) defines an array of teeth (39) and the locking plate (41) defines a plurality of recesses (43), adapted to receive the teeth, and lock the locking plate (41) relative to the output gear whenever the cam and ramp actuator (55) and the actuation members (85) move the locking plate to a locked position (FIG. 4).

4 Claims, 5 Drawing Sheets

ELECTRONICALLY ACTUATED LOCKING DIFFERENTIAL

CROSS-REFERENCE TO RELATED APPLICATIONS

This application is a continuation-in-part (CIP) of application U.S. Ser. No. 09/484,160, filed Jan. 18, 2000, now abandoned, in the names of Ross K. Cheadle and Joseph F. Rosiek for an "Electronically Actuated Locking Differential".

BACKGROUND OF THE DISCLOSURE

The present invention relates to a traction modifying differential, and more particularly, to such a differential of the type in which the differential gearing may be locked in response to an electrical input signal.

Traction modifying differentials of the type to which the present invention relates typically include a gear case defining a gear chamber, and disposed therein, a differential gear set including at least one input pinion gear, and a pair of output side gears. A clutch pack is typically disposed between at least one of the side gears and an adjacent surface of the gear case, such that the clutch pack is operable to limit relative rotation between the gear case and the one side gear. In most differentials of the type described, engaging the clutch pack is achieved by one of several different approaches.

In one approach, a "locking differential" of the type illustrated and described in U.S. Pat. No. Re 28,004, assigned to the assignee of the present invention and incorporated herein by reference, the clutch pack is normally disengaged. When one of the wheels begins to spin out, relative to the other wheel, a speed sensitive mechanism senses the speed differential and, by means of a ramping mechanism, locks the clutch pack solid. Thereafter, both outputs of the differential rotate at the same speed.

U.S. Pat. No. 5,019,021, also assigned to the assignee of the present invention and incorporated herein by reference, illustrates another approach, a "limited slip differential" in which the loading on the clutch pack may be varied in response to an external electrical input signal, thus varying the amount of slip within the clutch pack, and therefore, the amount of bias torque transmitted from one side gear to another. As is well known to those skilled in the art, in a limited slip differential, there is typically a certain amount of "slip", or speed differential, between the two side gears whenever the vehicle encounters less than optimum traction conditions.

Although the performance of limited slip and locking differentials of the type shown in the above-incorporated patents is, in general, quite satisfactory, there are certain disadvantages of each particular design, for certain vehicle applications. The requirement for at least one, and typically two clutch packs, adds substantially to the overall cost of the differential, especially when at least some of the individual clutch disks are provided with a relatively more sophisticated friction material, able to withstand elevated temperatures under continuous slipping conditions.

In addition, there are many vehicle applications in which it would be desirable to provide a traction modifying differential, to replace an existing open differential, but wherein the traction modifying differential would have to fit within the same space currently occupied by the open differential, in order to avoid a complete redesign of the surrounding structure. In such a situation, the addition of one or two clutch packs, within an existing differential case, would be impossible without redesigning the pinion gears and side gears and downsizing them, which is typically not feasible.

In an attempt to overcome the disadvantages of the differential devices noted above, the assignee of the present invention has developed an improved locking differential which is illustrated and described in an earlier application which was co-pending with the parent application of the present application, the earlier application having now issued as U.S. Pat. No. 6,083,134 for an "Electronically Actuated Locking Differential", assigned to the assignee of the present invention, and incorporated herein by reference. In the device of the cited patent, an electromagnetic coil initiates ramping of a ball ramp actuator in which one ramp plate is disposed outside of the differential case, while the other ramp plate is disposed within the differential case. There is a set of balls engaging the two ramp plates, the balls being disposed in slightly oversized openings in the end wall of the differential case. The ramp plate disposed within the differential case defines a set of teeth which are disposed to engage a mating set of teeth defined by the adjacent side gear, whenever the ball ramp actuator is displaced from its normal, centered condition to a ramped condition.

Although the differential device of the cited patent provides an improved locking differential which may be actuated in response to an external electrical signal, and may be either engaged or disengaged very quickly, and which is quite compact, there are however certain vehicle applications for which the device does not have sufficient strength, referring primarily to the differential case, and more particularly to the end wall having the cut-outs for the balls of the ball ramp actuator.

One of the problems commonly associated with locking differentials has been the inability of the differential to "disengage" from the locked condition when such is no longer needed. Typically, locking differentials have been able to unlock only in response to an event such as a torque reversal.

BRIEF SUMMARY OF THE INVENTION

Accordingly, it is an object of the present invention to provide a further improved locking differential of the general type illustrated and described in the cited patent, but which has improved overall strength and torque transmitting capability.

It is a more specific object of the present invention to provide such an improved locking differential which accomplishes the above-stated object by substantially reducing the size of any cut-out portions in the differential case end wall which are necessitated by the presence of the ball ramp actuator.

It is a related object of the present invention to provide such an improved locking differential which is capable of locking in response to an electrical input signal.

The above and other objects of the invention are accomplished by the provision of a differential gear mechanism including a gear case defining an axis of rotation and a gear chamber. Differential gearing is disposed in the gear chamber and includes at least one input gear and first and second output gears. The mechanism includes means operable to limit rotation of the first output gear relative to the gear case for common rotation therewith. The mechanism further includes actuation means for the rotation limiting means, the actuation means including first and second actuating plates comprising a cam and ramp type actuator, wherein relative rotation of the first and second actuating plates from an unactuated condition to an actuated condition is effective to move the rotation limiting means toward an engaged condition. The second actuating plate is disposed, in the unactuated condition, to rotate with the gear case, an electromagnetic actuator is disposed adjacent the second actuating plate and is operable, in response to an electrical input signal, to cause rotation of the second actuating plate relative to the gear case.

The improved differential gear means is characterized by the first and second actuating plates being disposed external to a gear case end wall, and the first actuating plate being axially moveable toward the end wall and having associated therewith a plurality of actuation members extending axially through the corresponding openings in the end wall. The rotation limiting means comprises a locking portion fixed for rotation with the first output gear. The locking portion and the plurality of actuation members cooperate to provide means for locking the first output gear in a non-rotatable locked position relative to the gear case, when the first actuating plate moves toward the end wall, moving the actuation members toward a locked position relative to the first output gear.

DETAILED DESCRIPTION OF THE PREFERRED EMBODIMENT

Figure 1:
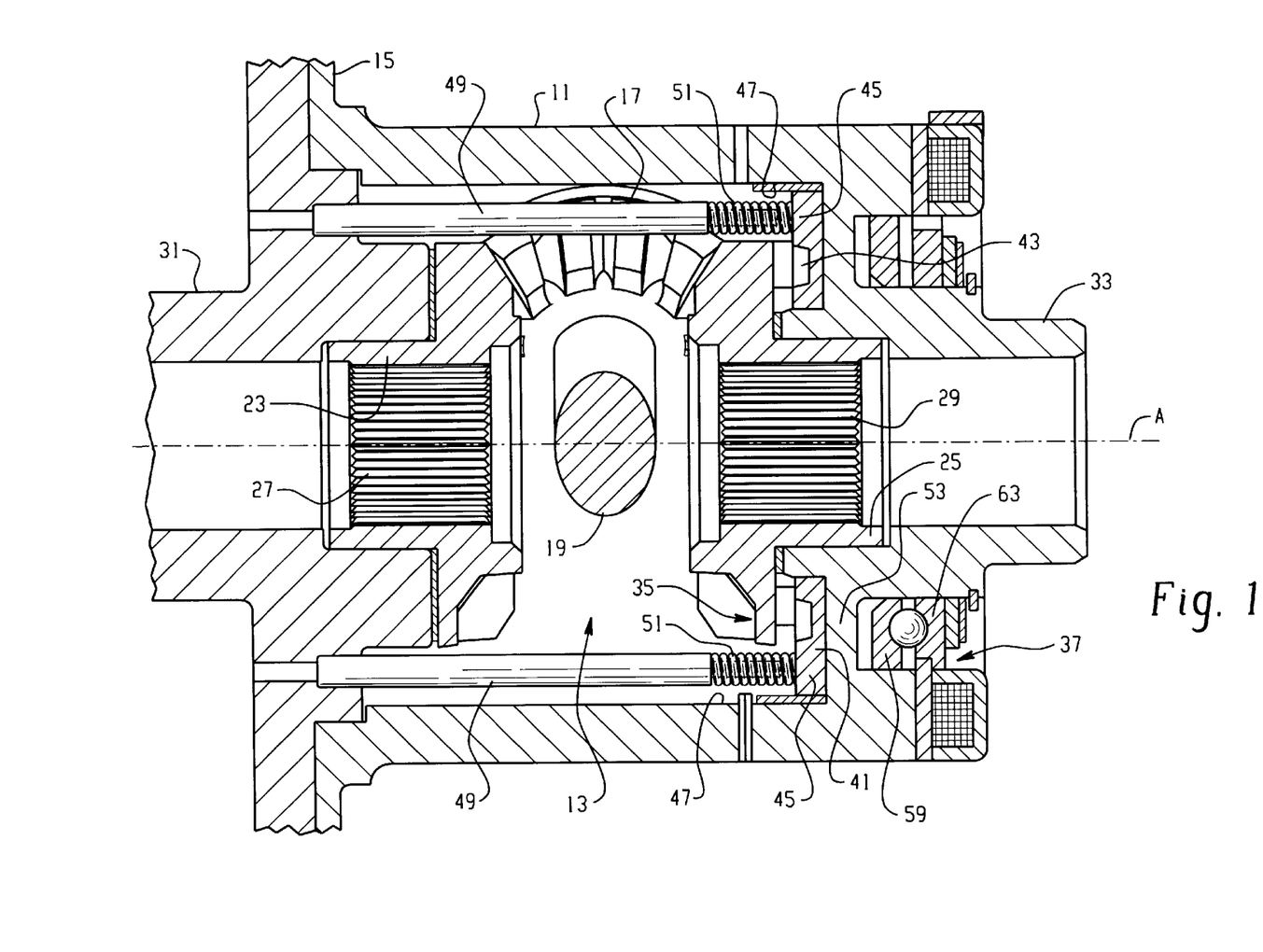
FIG. 1 is an axial cross-section of a locking differential made in accordance with the teachings of the present invention, in an unactuated, unlocked condition.

Referring now to the drawings, which are not intended to limit the invention, FIG. 1 is an axial cross-section of a locking differential including the present invention. The construction and operation of differentials of the general type illustrated in FIG. 1 may be better understood by reference to the above-incorporated patents.

The differential gear mechanism (locking differential) shown in FIG. 1 includes a gear case 11 which defines therein a gear chamber, generally designated 13. In the first embodiment, but by way of example only, the gear case 11 actually comprises two separate case elements which would typically be bolted together (not shown herein). Torque input to the differential is typically by means of an input ring gear (also not shown herein) which may be attached to a flange 15 of the gear case 11 by any suitable means, such as a plurality of bolts (also not shown herein).

Disposed within the gear chamber 13 is a differential gear set including a pair of input pinion gears 17 which are rotatably mounted on a pinion shaft 19. Typically, the pinion shaft 19 is secured relative to the gear case 11 by any suitable means, such as a locking pin (not shown herein) or a snap ring 20 (see FIG. 2). The pinion gears 17 comprise the input gears of the differential gear set, and are in meshing engagement with a pair of side gears 23 and 25. The side gears 23 and 25 define sets of internal, straight splines 27 and 29, respectively, which are adapted to be in splined engagement with mating external splines of a pair of axle shafts (not shown). The gear case 11 includes annular hub portions 31 and 33 on which may be mounted a pair of bearing sets (not shown herein) which are used to provide rotational support for the differential mechanism relative to an outer differential housing (also not shown herein).

As is well known to those skilled in the art, during normal, straight ahead operation of the vehicle, no differentiation occurs between the left and right side gears 23 and 25, and therefore, the pinion gears 17 do not rotate relative to the pinion shaft 19. The gear case 11, the pinion gears 17, and the side gears 23 and 25 all rotate about an axis of rotation A as a solid unit.

It should be understood that the locking differential of the present invention may be operated in either of a couple of modes. The differential may be operated manually, i.e., wherein the driver manually selects the locked mode, such that the differential operates in the locked mode almost immediately after the vehicle begins to move. Alternately, the locking differential may operate in an automatic mode wherein, by way of example only, the vehicle microprocessor senses an operating condition, such as incipient wheel slip, and transmits an appropriate electrical input signal to the locking differential, locking the side gear 25 relative to the gear case 11, to prevent any further differentiation.

In the case of automatic actuation of the locking differential, it will be understood that, under certain operating conditions, such as when the vehicle is turning, or a slight difference in tire size exists, it is permissible for a certain amount of differentiating action to occur between the side gears 23 and 25. However, in accordance with one important aspect of the invention, the locking differential of FIG. 1 does not include any clutch pack or any other mechanism which merely retards or limits differentiating action, but instead, operates in either an unactuated "open differential" mode or in an actuated, locked mode.

Figure 2:
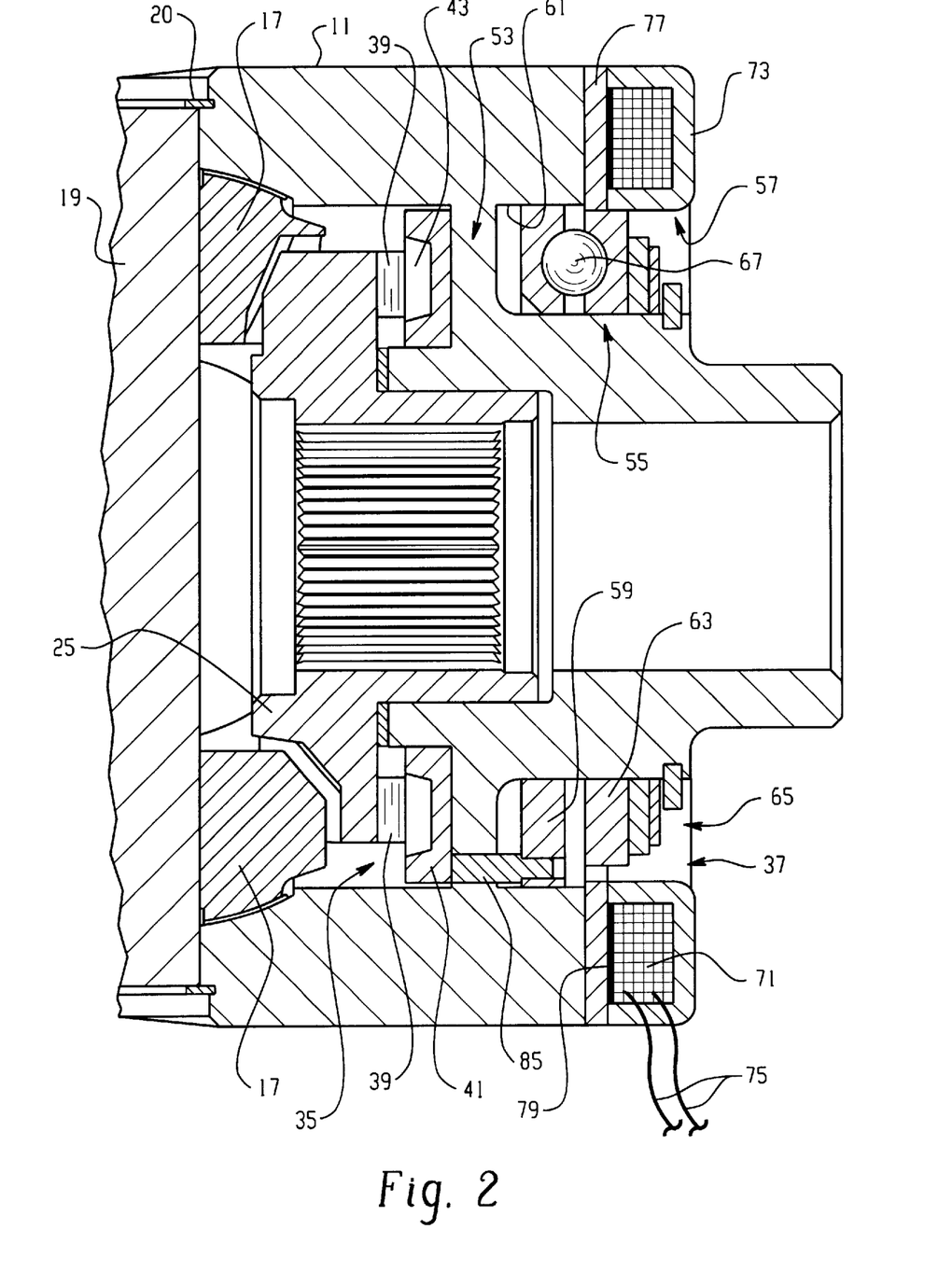
FIG. 2 is an enlarged, fragmentary, axial cross-section, similar to FIG. 1, but taken on a plane different than that of FIG. 1.

Referring still primarily to FIG. 1, but now in conjunction with FIG. 2, the locking differential of the invention includes a rotation limiting mechanism, generally designated 35, which is disposed entirely within the gear case 11. The locking differential also includes an actuation mechanism, generally designated 37, all of which is disposed external to the gear case 11, as will be described in greater detail subsequently.

Referring still primarily to FIG. 2, the rotation limiting mechanism 35 comprises the side gear 25 including an annular array of gear teeth 39, i.e., annular about the axis of rotation A. It should be understood that, although gear teeth are preferred, the particular configuration or type of teeth are not essential features of the invention, and in fact, a means other than teeth could be used within the scope of the invention, as will be described in greater detail subsequently in regard to the alternative embodiment of the invention. Disposed immediately adjacent the gear teeth 39 and in face-to-face relationship therewith, is an annular locking plate 41 (see also FIG. 3), shown in both FIGS. 1 and 2 as being out of engagement with the gear teeth 39. As may best be seen in FIG. 3, the annular locking plate 41 includes a plurality of recesses 43 which extend only partway through the axial thickness of the plate 41.

Figure 3:
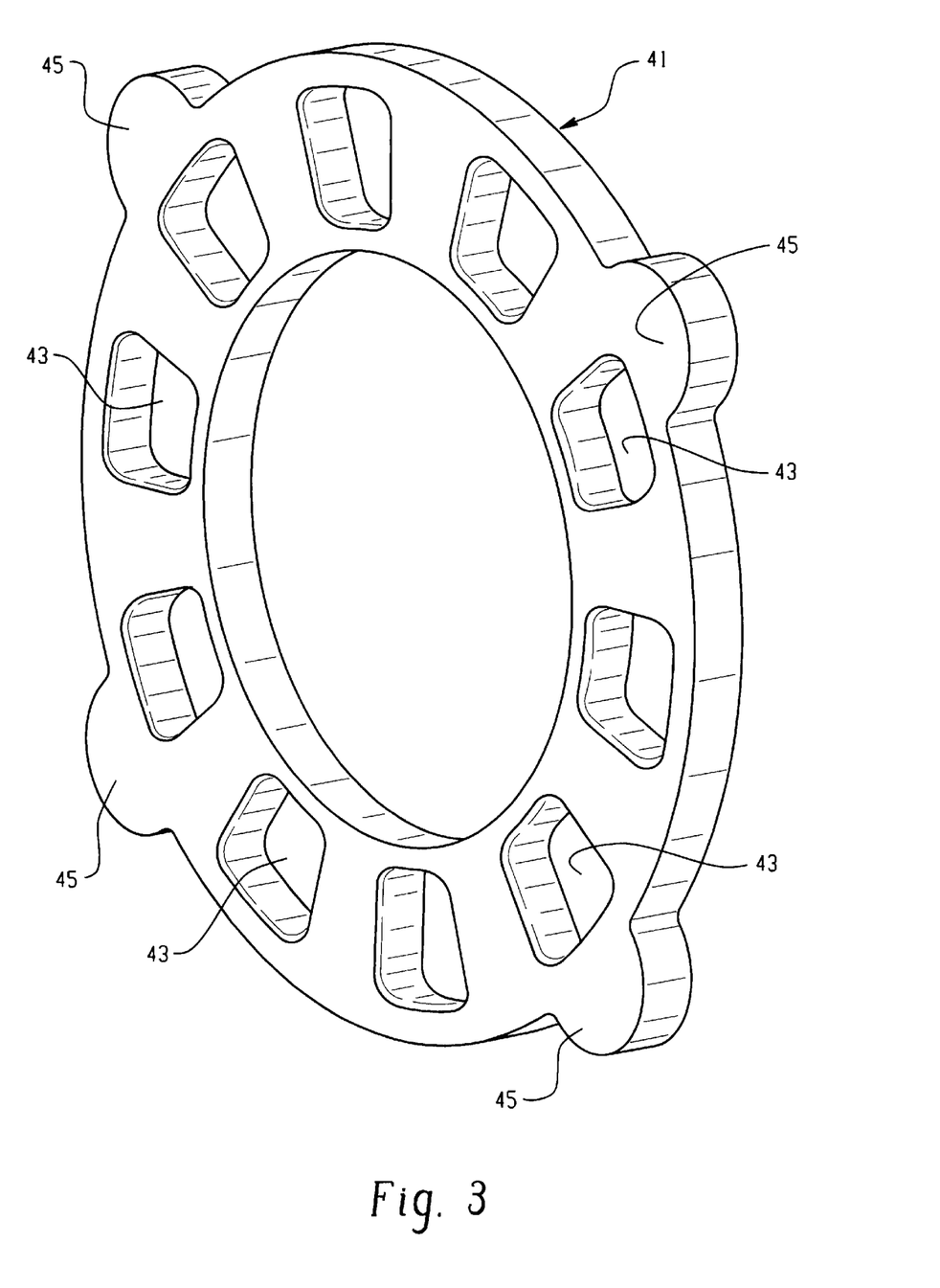
FIG. 3 is a perspective view of the locking plate of the present invention, illustrating one particular aspect of the invention.

The locking plate 41 includes a set of ears 45 (shown only in FIGS. 1 and 3). Preferably, the ears 45 are received within mating cut-out portions 47 (see FIG. 1) defined by the gear case 11, such that the locking plate 41 is non-rotatable relative to the gear case 11, but is able to move axially therein.

Referring again primarily to FIG. 1, the gear case 11 supports a plurality of spring support members 49 (two of which are shown in FIG. 1). Preferably, there are four of the members 49 corresponding to the four ears 45 on the locking plate 41. Disposed about the right end (in FIG. 1) of each of the spring support members 49 is a coil compression spring 51. With the locking plate 41 in the unactuated, unlocked position of FIG. 1, each of the springs 51 extends axially somewhat beyond the end of its respective support member 49, biasing the locking plate 41 against an adjacent surface of an end wall 53 of the gear case 11.

Referring again primarily to FIG. 2, the actuation mechanism 37 comprises two subassemblies, a ball ramp actuator, generally designated 55, and an electromagnetic actuator, generally designated 57. The ball ramp actuator 55 includes an annular inner actuating plate 59, disposed within an annular chamber 61 defined by the gear case 11. Disposed adjacent the actuating plate 59, but outside the chamber 61 is an outer actuating plate 63, which is restrained axially, relative to the gear case 11, by means of a retention assembly 65. As is well known to those skilled in the art, the actuating plates 59 and 63 define ramp surfaces, to be described in greater detail subsequently, and disposed therebetween is a plurality of cam members, illustrated herein as comprising cam balls 67, although it should be understood that various other types of cam members could be used. In some applications, the necessary "ramping" action may be achieved merely by the action of mating ramp surfaces, without any interposed cam members.

The electromagnetic actuator 57 preferably comprises an electromagnetic coil, generally designated 71, the function of which is to exert the required retarding torque on the outer actuating plate 63, thus initiating ramp up of the ball ramp actuator 55. The electromagnetic coil 71 is preferably annular, is concentric about the axis of rotation A, and is mounted to be stationary relative to the surrounding differential housing (not shown herein), such that the gear case 11 rotates relative to the coil 71. The coil 71 includes an annular coil housing 73, surrounding the coil 71 on three sides, the coil 71 being adapted to receive an electrical input signal by means of a pair of electrical leads 75, shown schematically in FIG. 2. Preferably, the electromagnetic coil 71 is made in accordance with the teachings of U.S. Pat. No. 5,911,643, assigned to the assignee of the present invention an incorporated herein by reference.

Associated with the coil 71, and disposed to the left thereof in FIG. 2, is an annular spacer plate 77, and disposed axially between the coil 71 and the spacer plate 77 is an annular layer of a suitable friction material, generally designated 79, such as a pyrolytic carbon friction material made in accordance with the teachings of U.S. Pat. No. 4,700,823, assigned to the assignee of the present invention and incorporated herein by reference. The spacer plate 77 comprises a magnetic material, so that the flux path surrounding the coil 71 passes through the spacer plate 77 when the coil 71 is energized, and draws the spacer plate 77 into frictional engagement with the frictional material 79. Alternatively, instead of the spacer plate 77 engaging the layer of friction material 79, the spacer plate 77 could engage the adjacent end surfaces of the annular coil housing 73, i.e., either the radially outer end surface, or the radially inner end surface, or both. At its radially inner periphery, the spacer plate 77 is in engagement with the outer periphery of the outer actuating plate 63. Thus, when the coil 71 is de-energized, the spacer plate 77 rotates with the actuating plate 63, which in turn rotates with the gear case 11, and relative to the coil 71.

Figure 4:
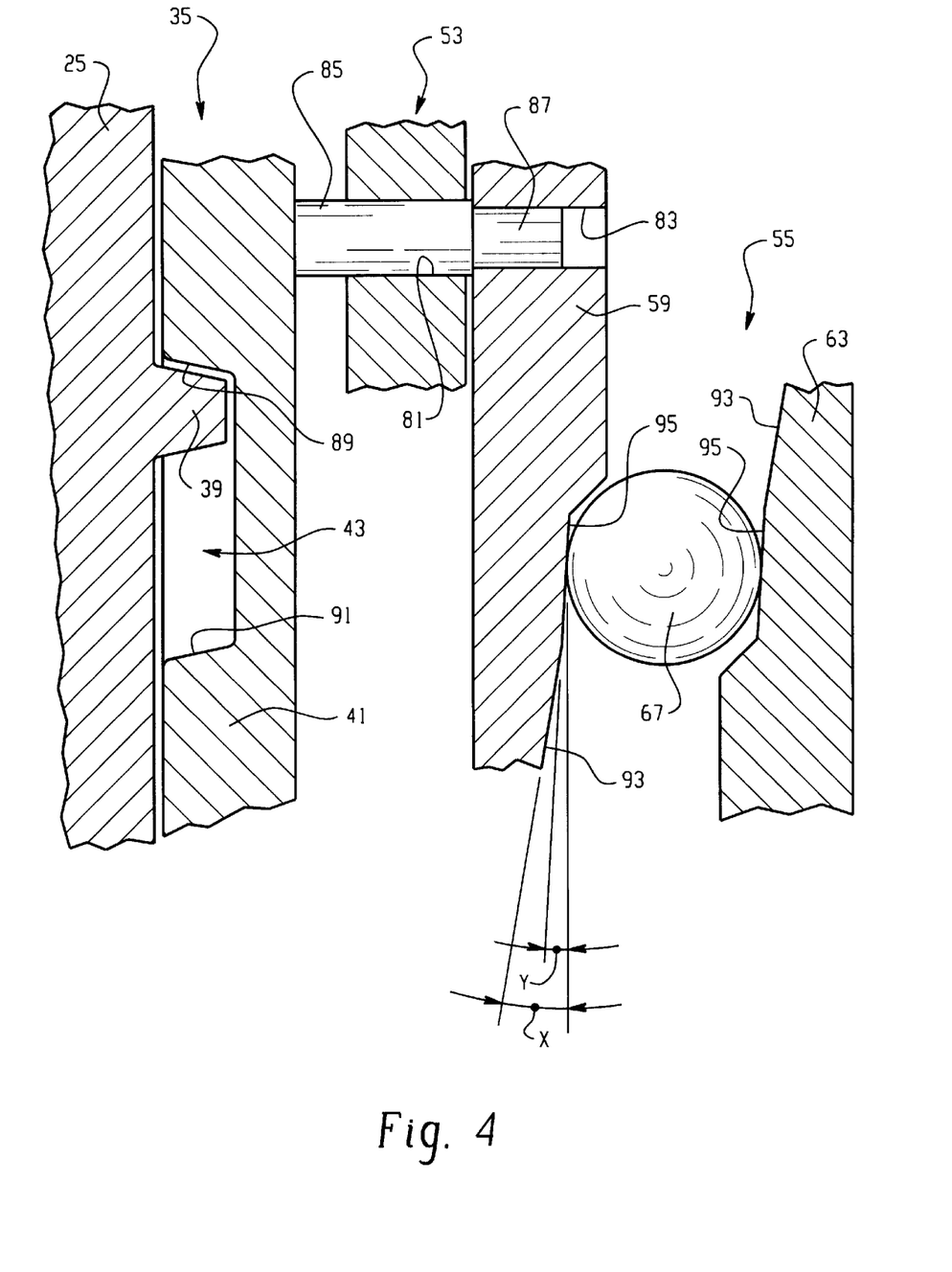
FIG. 4 is a further enlarged, fragmentary, somewhat schematic, axial cross-section, illustrating the ball ramp actuator and the side gear and the locking plate in the actuated, locked condition.

Referring now also to FIG. 4, in conjunction with FIG. 2, the rest of the rotation limiting mechanism, the ball ramp actuator, and the operation of the invention will be described. In accordance with an important aspect of the invention, the gear case end wall 53 defines three relatively small circular bores 81, and adjacent thereto the inner actuating plate 59 defines three small circular bores 83. Disposed for reciprocation in each bore 81 is an actuating pin 85, each pin 85 having at its right end in FIGS. 2 and 4 a reduced diameter portion 87 which is press-fit into the adjacent bore 83. Thus, during actuation or ramping of the ball ramp actuator 55, the inner actuating plate 59 moves from its unactuated position shown in FIG. 2, spaced apart from the end wall 53, toward its actuated position shown somewhat schematically in FIG. 4, disposed close to the end wall 53.

However, as was mentioned in the BACKGROUND OF THE DISCLOSURE, one of the objects of the invention is to provide a stronger gear case than was possible with the device of the cited patents, having the cam balls disposed in openings in the end wall. In FIG. 4, it may be seen that the total cut-out area from the end wall 53 for three of the cam balls 67 would be much greater than that required for three of the actuating pins 85. It is because of the engagement of the pins 85 with the locking plate 41 that the recesses 43 extend only part of the way through the axial thickness of the plate 41. The remaining thickness of the locking plate 41, behind the recess 43, must be sufficient to withstand the axial force exerted by the actuating pins 85 when the ball ramp actuator 55 ramps-up.

As the inner actuating plate 59 moves to the left in FIGS. 2 and 4, as described above, such leftward movement is transmitted, by means of the actuating pins 85, to the locking plate 41, thus moving the locking plate 41 from its unlocked position, shown in FIG. 2 disposed immediately adjacent the end wall 53, to its locked position, shown in FIG. 4, now spaced apart from the end wall 53. More importantly, as the locking plate 41 moves toward its locked position, each of the recesses 43 begins to engage an adjacent tooth 39 on the side gear 25, such that continued rotation of the gear case 11 and locking plate 41 (assume "downward" in FIG. 4) will result in torque being transmitted directly to the side gear 25, driving both of the side gears 23 and 25 in the same direction and at the same speed as the gear case 11.

Referring again primarily to FIG. 4, it may be seen that each recess 43 is bounded circumferentially by surfaces 89 and 91, each of which is disposed at an acute angle relative to the axis of rotation A. In the subject embodiment, and by way of example only, the surfaces 89 and 91 each define an angle of about 5 degrees relative to the axis of rotation A. Similarly, each tooth 39 has its tooth flanks oriented at about the same angle, such that there will be face-to-face engagement between the surface 89 and the adjacent tooth flank, over at least a portion thereof, when driving the side gear in the direction as represented in FIG. 4.

In accordance with another aspect of the invention, each of the actuating plates 59 and 63 preferably includes a compound ramp surface. Therefore, each half of the ramp surface of each of the plates 59 and 63 includes an initial, steeper ramp surface 93 and a terminal, shallower ramp surface 95. In the subject embodiment, and by way of example only, the steeper ramp surface (represented in FIG. 4 by the angle "X") is in the range of about 12 to about 14 degrees, while the shallower ramp surface 95 (represented in FIG. 4 by the angle "Y") is in the range of about 3 to about 5 degrees.

In accordance with still another aspect of the invention, the angle of the surfaces 89 and 91 and the flank of each tooth 39 has been selected and coordinated with the angle "X" of the shallower ramp surface 95 such that the ball ramp actuator 55 exerts just enough axial force, when the coil 71 is energized, to keep the locking plate 41 and the side gear teeth 39 in engagement. In other words, if the angle "X" were increased from the angle selected, thus reducing the generated axial force, the locking plate 41 would probably disengage itself from the teeth 39, aided by the biasing force of the springs 51, in opposition to the force of the ball ramp actuator 55. Therefore, when the locked condition of the differential is no longer necessary, and the coil 71 is de-energized, the ball ramp actuator 55 will move from its extreme, ramped-up condition shown in FIG. 4 toward a neutral, centered condition as shown in FIG. 2. With the axial force exerted by the ball ramp actuator 55 thus relieved, the angle of the surface 89 and the flank of the tooth 39 causes disengagement of the tooth 39 from the recess 43, and axial movement of the locking plate 41 from the locked position shown in FIG. 4 back toward the unlocked position shown in FIG. 2. Thus, the locking differential of the present invention disengages (i.e., goes from locked to unlocked) automatically when the electrical input signal 75 corresponds to the de-energized condition of the coil 71.

Figure 5:
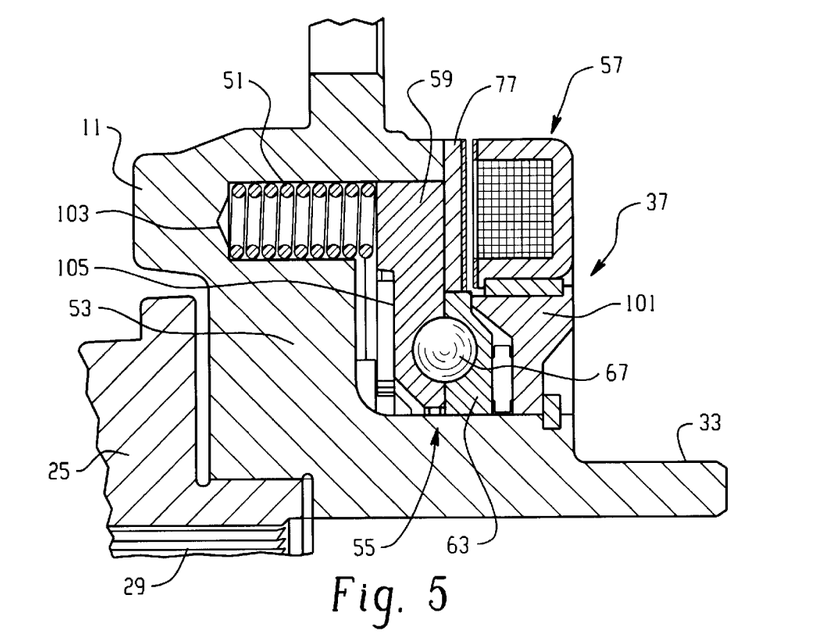
FIG. 5 is an enlarged, fragmentary, axial cross-section, similar to FIG. 2, but illustrating an alternative embodiment of the present invention.
Figure 6:
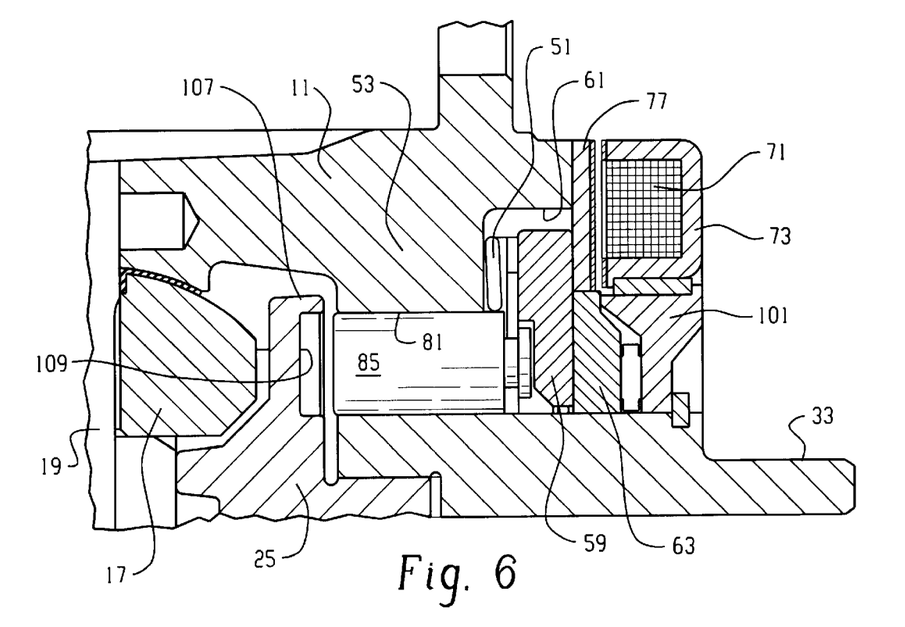
FIG. 6 is an enlarged, fragmentary, axial cross-section of the alternative embodiment shown in FIG. 5, but taken on a plane different than that of FIG. 5.

Referring now primarily to FIGS. 5 and 6, an alternative embodiment of the present invention will be described, in which like or similar elements will bear like reference numerals, and new elements will bear reference numerals in excess of "100". The electromagnetic coil 71 is disposed about a bushing member 101, engaging a diameter of the gear case 11 adjacent the hub portion 33. As may best be seen in FIG. 5, the gear case 11 defines a plurality of spring bores 103, and disposed in each bore 103 is one of the compression springs 51, the function of which is to return the ball ramp actuator 55 to its neutral condition shown in FIGS. 5 and 6. The difference in this embodiment is that there is no locking plate 41 and therefore, the springs 51 directly engage the inner actuating plate 59. The inner actuating plate 59 defines an "inner" surface 105 (on its left side in FIG. 5), the function of which will be described subsequently.

Referring now primarily to FIG. 6, the side gear 25 includes, toward its outer periphery, a flange-like locking portion 107 which defines a plurality of locking recesses 109 on its side facing the end wall 53 of the gear case 11. In this alternative embodiment, and by way of example only, there are six of the recesses 109, each of which may have any one of a number of configurations. By way of example only, when viewed from the right in FIG. 6, the recesses 109 have a shape which is either circular or a slightly elongated circle, each being slightly larger than an adjacent one of the actuating pins 85. The difference in this embodiment is that each of the pins 85, instead of engaging the locking plate 41, directly engages the side gear 25 by engaging the locking portion 107, and more specifically by the inner end of each pin 85 (the left end in FIG. 6) moving into the respective recess 109.

In operation, the second embodiment operates substantially the same as the first embodiment, except for the difference noted above. During normal operation, the coil 71 is de-energized, and the ball ramp actuator 55 is biased to its neutral condition, and the pins 85 are in their retracted position as shown, such that the device operates as an open differential. When it is desired to lock the differential, the coil 71 is energized, causing actuation of the ball ramp actuator 55, as described previously, causing the inner actuating plate 59 to move leftward in FIGS. 5 and 6, toward the end wall 53. This movement of the plate 59 will overcome the biasing force of the springs 51 and move each of the pins 85 leftward into its respective recess 109, thus locking the locking portion 107 and the side gear 25 in a fixed condition, non-rotatable relative to the gear case 11.

When the need for operation in the locked mode no longer exists, such as when the vehicle again has good traction, the coil 71 is again de-energized, such that the inner and outer actuating plates 59 and 63 can again rotate at the same speed. The springs 51 return the plate 59 to the position shown in FIG. 5, returning the pins to the position shown in FIG. 6, retracted from the recesses 109, again permitting the device to operate as an open differential.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A differential gear mechanism including a gear case defining an axis of rotation and a gear chamber; differential gearing disposed in said gear chamber including at least one input gear and first and second output gears; means operable to limit rotation of said first output gear relative to said gear case for common rotation therewith; actuation means for said rotation limiting means, said actuation means including first and second actuating plates comprising a cam and ramp actuator, wherein relative rotation of said first and second actuating plates from an unactuated condition to an actuated condition is effective to move said rotation limiting means toward an engaged condition; said second actuating plate being disposed, in said unactuated condition, to rotate with said gear case; an electromagnetic actuator disposed adjacent said second actuating plate and operable, in response to an electrical input signal, to cause rotation of said second actuating plate relative to said gear case; characterized by:

(a) said first and second actuating plates being disposed external to a gear case end wall, and said first actuating plate being axially moveable toward said end wall and having associated therewith a plurality of actuation members extending axially through corresponding openings in said end wall;

(b) said rotation limiting means comprising a locking portion fixed for rotation with said first output gear;

(c) said locking portion and said plurality of actuation members cooperating to provide means for locking said first output gear to a non-rotatable locked position relative to said gear case when said first actuating plate moves toward said end wall, moving said actuation members toward a locked position relative to said first output gear; and (d) said electromagnetic actuator comprising a stationary, generally annular electromagnetic coil disposed in a generally surrounding relationship to said second actuating plate, and said electromagnetic actuator including a member fixed to rotate with said second actuating plate.

2. A differential gear mechanism as claimed in claim 1, characterized by means biasing said first actuating plate from said locked position away from said gear case end wall when said first and second actuating plates are in said unactuated condition.

3. A differential gear mechanism as claimed in claim 1, characterized by said locking portion being generally annular about said axis of rotation, and said plurality of actuation members being disposed in a generally annular array about said axis of rotation and axially adjacent with said locking portion.

4. A differential gear mechanism as claimed in claim 1, characterized by said actuation means further comprising a plurality of cam members in operable engagement with said first and second actuating plates.

* * * * *